(12) United States Patent
Yancey et al.

(10) Patent No.: US 6,396,673 B1
(45) Date of Patent: May 28, 2002

(54) REDUCED-LOSS, HIGH-FREQUENCY SIGNAL TRANSMISSION SYSTEM UTILIZING AN OVER-VOLTAGE AND OVER-CURRENT PROTECTION DEVICE

(75) Inventors: Glenn Yancey, Burleson; Mark Szewczul, Bedford, both of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/415,362

(22) Filed: Oct. 8, 1999

(51) Int. Cl.$^7$ .............................................. H01H 3/08
(52) U.S. Cl. ...................................... 361/93.1
(58) Field of Search ...................... 361/93.1, 104, 361/119, 120, 127, 111, 3, 54; 372/38, 26, 43; 341/268; 375/36; 370/31

(56) References Cited

U.S. PATENT DOCUMENTS

| | | |
|---|---|---|
| 4,314,304 A | 2/1982 | Baumbach |
| 4,325,100 A | 4/1982 | Baumbach |
| 4,422,121 A | 12/1983 | Baumbach |
| 4,876,621 A | 10/1989 | Rust et al. |
| 4,907,120 A | 3/1990 | Kaczmarek et al. |
| 4,958,253 A | 9/1990 | Gilberts et al. |
| 4,964,140 A * | 10/1990 | Yonekura ..................... 375/36 |
| 5,050,210 A | 9/1991 | Dillon et al. |
| 5,113,186 A * | 5/1992 | Remson ....................... 341/68 |
| 5,195,015 A | 3/1993 | Kaczmarek |
| 5,245,412 A * | 9/1993 | Clark ......................... 257/601 |
| 5,311,114 A * | 5/1994 | Sambamuthy et al. ........ 370/31 |
| 5,570,263 A | 10/1996 | Dion et al. |
| 5,670,799 A | 9/1997 | Croft |
| 5,706,157 A | 1/1998 | Galecki et al. |
| 5,706,303 A * | 1/1998 | Lawrence ..................... 372/38 |
| 5,757,599 A | 5/1998 | Crane |
| 5,790,363 A | 8/1998 | Chaundhry |
| 5,815,389 A | 9/1998 | Plow et al. |
| 5,877,534 A | 3/1999 | Williams et al. |
| 6,005,477 A * | 12/1999 | Deck ..................... 340/310.06 |

OTHER PUBLICATIONS

Semiconductor Components Industries, LLC, 201, 1500 Watt Mosorb Zener Transcient Voltage Supressors, 6/2001, Litterature Distribution Center for Semicondor, Denver, Colorado, Rev. 1, pp. 1–8.*

* cited by examiner

Primary Examiner—Brian Sircus
Assistant Examiner—J. F. Duverne
(74) Attorney, Agent, or Firm—Jones, Day, Reavis & Pogue

(57) ABSTRACT

A communications system including an over-voltage and over-current surge protection circuit is provided that passes high frequency signals between transmitting and receiving devices with low attenuation. The protection circuit includes a current limiter and over-voltage protection device. The over-voltage protection device includes a diode device comprising a set of anti-parallel diodes, which is connected in series with a shunt device. The over-voltage protection device is coupled between a signal transmission line and ground. The current limiter is coupled between the transmitting and receiving devices.

11 Claims, 2 Drawing Sheets

US 6,396,673 B1

REDUCED-LOSS, HIGH-FREQUENCY SIGNAL TRANSMISSION SYSTEM UTILIZING AN OVER-VOLTAGE AND OVER-CURRENT PROTECTION DEVICE

BACKGROUND OF THE INVENTION

1. Field of the Invention

The present invention relates to the field of electronic surge protection circuits. More specifically, the invention relates to a surge protection circuit for communication networks that carry high-speed digital signals.

2. Description of the Related Art

In a typical communication network, telephone lines carry voice and data signals from a remote unit to a local unit. For example, in the context of a digital loop carrier ("DLC") system for extending fiber optic cable into the local-loop between a central office location and a plurality of subscribers, the remote unit could be a remote digital terminal ("RDT") or an optical network unit ("ONU"), and the local unit could be a network interface device ("NID"). The NID further couples the signals to the subscriber's telephony and data devices, which are referred to as customer premises equipment ("CPE").

The connections between the local units and the CPE usually include unshielded twisted pair ("UTP") wire. There is a first twisted pair used for incoming signals that travel from the network towards the CPE and a second twisted pair used for outgoing signals that travel away from the CPE towards the network. These UTP wires are susceptible to voltage and current surges often caused by lightning strikes or AC power (60 Hz) crosses. Therefore, surge protection devices or circuits are typically coupled to the UTP wires to protect the remote and local units, and the CPE, from being damaged by over-voltage and over-current conditions. For signal lines that carry high speed signals, such as 10Base-T Ethernet signals, such surge protection devices must have a low insertion-loss in order to avoid attenuation of the signals at high frequencies.

SUMMARY OF THE INVENTION

A communications system including an over-voltage and over-current surge protection circuit is provided that passes high frequency signals between transmitting and receiving devices with low attenuation. The protection circuit includes a current limiter and over-voltage protection device. The over-voltage protection device includes a diode device comprising a set of anti-parallel diodes, which is connected in series with a shunt device. The over-voltage protection device is coupled between a signal transmission line and ground. The current limiter is coupled between the transmitting and receiving devices.

As will be appreciated, the invention is capable of other and different embodiments, and its several details are capable of modifications in various respects, all without departing from the invention. Accordingly, the drawings and description of the preferred embodiments are to regarded as illustrative in nature and not restrictive.

BRIEF DESCRIPTION OF THE DRAWINGS

The present invention will be apparent to those skilled in the art upon reading the following description in view of the accompanying drawings, wherein.

DESCRIPTION OF THE PREFERRED EMBODIMENTS

Figure 1:
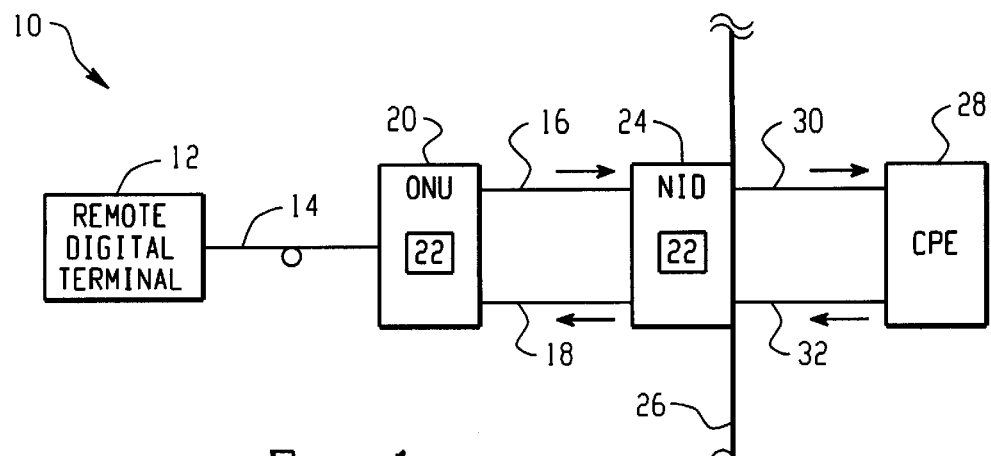
FIG. 1 is a block diagram illustrating a signal transmission system utilizing a protection device according to one embodiment of the present invention.

FIG. 1 shows a system 10 according to a preferred embodiment of the present invention. This system is preferably a fiber-to-the-curb ("FTTC") DLC system in which the fiber optic connections are pushed deep into the local loop to within 500 feet of the subscriber's CPE 28. The system 10 includes a remote unit 12, which is preferably an RDT that transmits and receives voice and/or data signals on one or more fiber optic connections 14. These fiber optic connections 14 couple the RDT to a plurality of ONUs 20. The ONUs are, in turn, coupled to a plurality of NIDs 24 via a pair of UTP wires 16, 18. Alternatively, the RDT 12 could connect directly to the NIDs 24 via UTP wires coupled to the RDT 12 and the NIDs 24. (Note that in this case the protection device 22 would be installed within the RDT 12, or in close proximity thereto.)

The NIDs 24 are preferably mounted on the exterior of a subscriber's house or building 26, although they could be mounted internally to this structure. From the NID 24, a second pair of wires 30, 32 couple the NID to the CPE 28. The protection circuit of the present invention 22 is preferably mounted within the ONU 20 and the NID 24, although it could be installed in just one of these two devices, or it could be installed external to these devices. Moreover, in the alternative embodiment in which the RDT 12 is connected directly to the NIDs 24, the protection circuit 22 would be mounted within or nearby the RDT 12.

In this system 10, a signal is transmitted from the remote unit 12 along the fiber optic connection 14 to the ONU 20. At the ONU 20, the signal is coupled through the protection device 22 onto one of the UTP wires 16, and is then coupled to the NID 24. At the NID 24, the signal is preferably coupled through a second protection device 22, onto the internal wiring 30 and then to the CPE 28. Similarly, signals from the CPE 28 are coupled to the RDT 12 through the NID 24, UTP wires 18, ONU 20, and the two protection devices 22. The protection circuit 22 provides over-voltage and over-current protection for the ONU 20 and the CPE 28, while also permitting high-frequency signals to pass through the circuit 22 with low signal attenuation.

Figure 2:
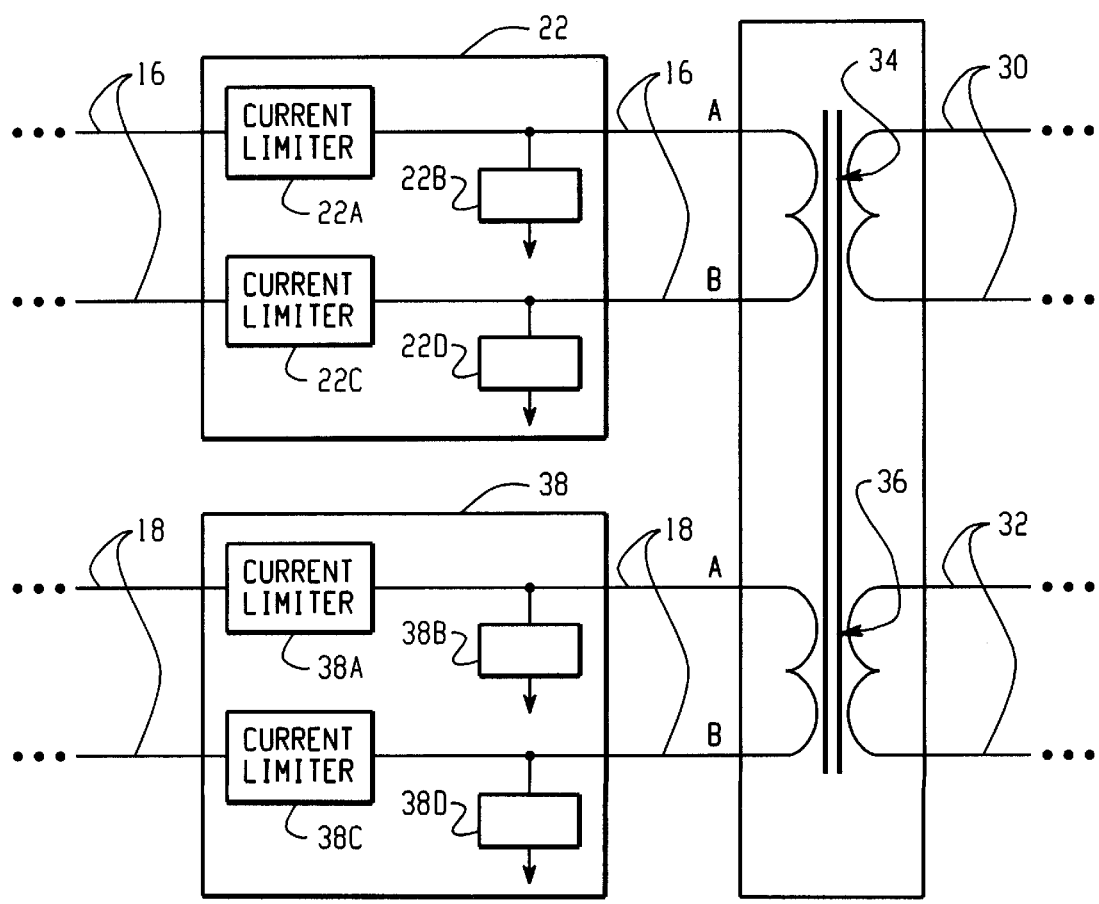
FIG. 2 is a schematic diagram of a preferred surge protection device and an isolation transformer incorporated into a Network Interface Device as shown in FIG. 1.

A more detailed view of a protection circuit 22 according to the preferred embodiment of the present invention is shown in FIG. 2. As seen here, the protection circuit 22 includes current limiters 22A and 22C, i.e., over-current protection devices, and over-voltage protection devices 22B and 22D. The current limiters 22A and 22C are connected in series with first and second lines 16A and 16B of the incoming twisted pair, and the over-voltage protection devices 22B and 22D are connected between the lines 16A and 16B and ground. Each of the current limiters 22A and 22C is preferably a bi-directional device that limits the amount of current that can pass through the device, e.g., resistance or inductance based devices. Various commercially available solid-state devices can be used for current limiters 22A and 22C.

FIG. 2 also shows a more detailed view of the NID 24. The NID 24 includes a pair of isolation transformers 34 and 36, which share the same core. These transformers 34 and 36 preferably have a 1:1 ratio, and they are inserted between the twisted pairs 16 and 30, and the twisted pairs 18 and 32, respectively. Various commercially available solid state devices can be used for the isolation transformers 34 and 36.

Due to the long distance signals must travel along lines 16A, 16B, 18A, and 18B, a ground voltage potential can build up that may affect the function of the system 10. Also this ground potential can vary along a wire of this length. The transformers 34 and 36 isolate this ground potential and decouple the CPE from the loop.

As seen in FIG. 2, the system 10 further includes a second protection device 38, which is identical to the first protection device 22. The second protection device performs the same function as the first device, but for the outgoing twisted pair 18. The second protection device 38 includes first and second current limiters 38A and 38C, and first and second over-voltage devices 38B and 38D.

Figure 3A:
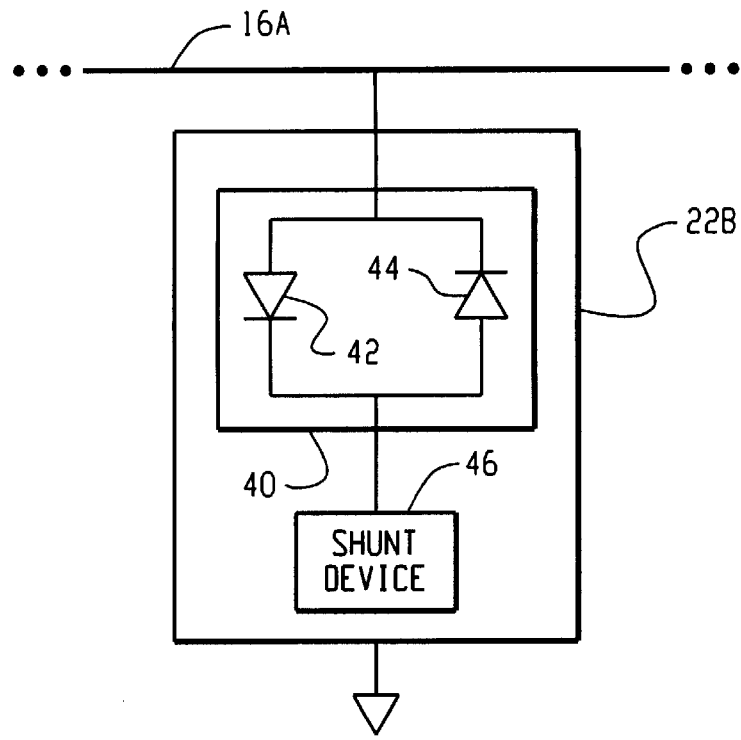
FIG. 3A illustrates a protection device circuit architecture according to a first embodiment of the present invention.
Figure 3B:
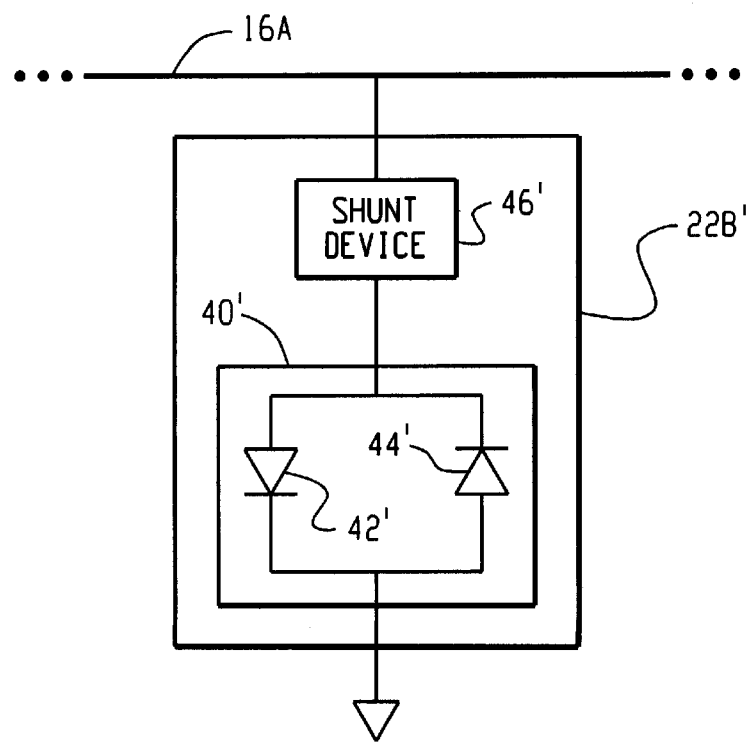
FIG. 3B illustrates a protection device circuit architecture according to a second embodiment of the present invention.

FIGS. 3A and 3B illustrate first and second preferred embodiments, respectively, of the over-voltage protection device 22B, which is identical to the over-voltage protection devices 22D, 38B, and 38D. In the first embodiment shown in FIG. 3A, the over-voltage protection device 22B includes a diode device 40 and a shunt device 46. The diode device 40 preferably includes a set of anti-parallel diodes 42 and 44, which are coupled between line 16A and the shunt device 46. The shunt device 46 is coupled between the diode device 40 and ground.

In contrast, in the second embodiment shown in FIG. 3B, the protection device 22B' includes the same serially-connected elements as FIG. 3A, but connected in reverse order. Thus, the over-voltage device 22B' includes a diode device 40', which preferably includes a set of anti-parallel diodes 42' and 44', coupled between a shunt device 46' and ground, where the shunt device 46' is coupled between the line 16A and the diode device 40'.

Each of the solid-state shunt devices 46 and 46' is a bi-directional device designed to limit the voltage across the device to a particular threshold voltage. Preferably, these devices utilize transient voltage supressor ("TVS") clamping or thyristor "crow bar" devices. Other devices could also be used in place of the TVS clamp or crow bar device. Various commercially available solid state devices can be used for the over-voltage shunting devices.

The sets of anti-parallel diodes 42 and 44, and 42' and 44' are connected in series with the shunt devices 46 and 46' between line 16A and ground to reduce the overall capacitance of the protection device. High capacitance in such a protection device causes attenuation of signals at high frequencies.

In operation, the protection circuits 22 and 38 shunt any voltage surge or over-voltage signal to ground. The diode devices 40 and 40' connected in series with the shunt device 46 and 46' between line 16A and ground reduce the overall capacitance $C_{eq}$ of the over-voltage protection device 22B and 22B'. The capacitance value $C_{eq}$ is reduced by placing the intrinsic capacitances of the solid-state devices in series, e.g., the shunt devices 46 and 46' and the diode devices 40 and 40'. When capacitors are connected in series the overall capacitance $C_{eq}$ is reduced according to the formula [1]:

$$\frac{1}{Ceq} = \frac{1}{C1} + \frac{1}{C2} + \ldots + \frac{1}{Cn} \quad [1]$$

Thus, with a lower capacitance ($C_{eq}$) high frequency signals pass through the protection devices 22 and 38 with low signal loss, i.e., low attenuation.

The invention has been described with reference to preferred embodiments. Those skilled in the art will perceive improvements, changes, and modifications. Such improvements, changes and modifications are intended to be covered by the appended claims.

We claim:

1. A high-frequency signal transmission system, comprising:
    a remote unit configured to transmit and receive high-frequency signals over a first transmission medium;
    a network interface device (NID) coupled to the remote unit through the first transmission medium and configured to couple the first transmission medium to a second transmission medium;
    a customer premises equipment (CPE) coupled to the NID through the second transmission medium; and
    a surge protection circuit coupled to the first transmission medium, wherein the surge protection circuit comprises:
        a current limiting device coupled in series with the first transmission medium;
        an over-voltage protection shunt device coupled between the first transmission medium and ground; and
        a diode device coupled in series with the over-voltage protection shunt device in order to reduce signal attenuation in the high-frequency signals.

2. The high-frequency signal transmission system of claim 1, wherein the remote unit is an optical network unit (ONU).

3. The high-frequency signal transmission system of claim 1, wherein the remote unit is a remote digital terminal (RDT).

4. The high-frequency signal transmission system of claim 1, wherein the NID couples the first transmission medium to the second transmission medium through an isolation transformer.

5. The high-frequency signal transmission system of claim 1, wherein the diode device in the surge protection circuit is a set of anti-parallel diodes.

6. The high-frequency signal transmission system of claim 1, wherein the over-voltage protection shunt device in the surge protection circuit includes a transient voltage suppressor (TVS).

7. The high-frequency signal transmission system of claim 1, wherein the over-voltage protection shunt device in the surge protection circuit includes a thyristor crow bar device.

8. The high-frequency signal transmission system of claim 1, wherein the first and second transmission media are a twisted pair of wires, and wherein the surge protection circuit is coupled to one of the twisted pair of wires in the first transmission medium, and further comprising an additional surge protection circuit coupled to another of the twisted pair of wires in the first transmission medium.

9. The high-frequency signal transmission system of claim 1, wherein the remote unit is an optical network unit (ONU), and further comprising a remote digital terminal coupled to the ONU through an optical fiber transmission medium.

10. The high-frequency signal transmission system of claim 1, wherein the high-frequency signals are 10Base-T Ethernet signals.

11. A high-frequency signal transmission system, comprising:
    a remote digital terminal (RDT) configured to transmit and receive high-frequency signals over an optical fiber transmission medium;

an optical network unit (ONU) coupled to the RDT through the optical fiber transmission medium and configured to coupled the optical fiber transmission medium to a first local transmission medium;

a network interface device (NID) coupled to the ONU through the first local transmission medium and including an isolation transformer configured to couple the first local transmission medium to a second local transmission medium;

a customer premises equipment (CPE) coupled to the NID through the second local transmission medium;

a first surge protection circuit located in or in close proximity to the NID and coupled to the first local transmission medium; and a second surge protection circuit located in or in close proximity to the ONU and coupled to the first local transmission medium;

wherein the first and second surge protection circuits each comprise: a current limiting device coupled in series with the first local transmission medium; an over-voltage protection shunt device coupled between the first local transmission medium and ground; and a diode device coupled in series with the over-voltage protection shunt device in order to reduce signal attenuation in the high-frequency signals.

* * * * *